(12) United States Patent
Taguchi et al.

(10) Patent No.: US 7,385,760 B2
(45) Date of Patent: Jun. 10, 2008

(54) OPTICAL ELEMENT AND OPTICAL PICKUP DEVICE USED THEREWITH

(75) Inventors: Tomokazu Taguchi, Sakai (JP); Takuji Hatano, Suita (JP)

(73) Assignee: Konica Minolta Opto, Inc., Tokyo (JP)

( * ) Notice: Subject to any disclaimer, the term of this patent is extended or adjusted under 35 U.S.C. 154(b) by 238 days.

(21) Appl. No.: 11/287,798

(22) Filed: Nov. 28, 2005

(65) Prior Publication Data

US 2006/0114562 A1 Jun. 1, 2006

(30) Foreign Application Priority Data

Nov. 29, 2004 (JP) ............... 2004-343643

(51) Int. Cl.
*G02B 5/30* (2006.01)

(52) U.S. Cl. ............ 359/495; 359/490; 359/634

(58) Field of Classification Search ............ None
See application file for complete search history.

(56) References Cited

U.S. PATENT DOCUMENTS 2,409,407 A * 10/1946 Turner ............... 359/487

4,084,883 A * 4/1978 Eastman et al. ............ 359/487
2002/0093902 A1 7/2002 Hirai et al.

FOREIGN PATENT DOCUMENTS

JP 2002-358683 12/2002

* cited by examiner

*Primary Examiner*—Stephone B. Allen
*Assistant Examiner*—Derek S Chapel
(74) *Attorney, Agent, or Firm*—Brinks Hofer Gilson & Lione

(57) ABSTRACT

An optical element for reflecting light has a substrate and a thin film formed on the substrate. The thin film reflects light in a predetermined reflection wavelength band so that the thin film adjusts a difference in phase differences between a P-polarized light component and S-polarized light component of an incident light to the thin film and between P-polarized light component and S-polarized light component of the reflected light to 180°±10° at an absolute value.

12 Claims, 13 Drawing Sheets

OPTICAL ELEMENT AND OPTICAL PICKUP DEVICE USED THEREWITH

This application is based on the application No. 2004-343643 filed in Japan Nov. 29, 2004, the entire content of which is hereby incorporated by reference.

BACKGROUND OF THE INVENTION

1. Field of the Invention

The present invention relates to an optical element and an optical pickup device used therewith, and more particularly, to the optical element having a phase difference adjusting function and the optical pickup device used therewith.

2. Description of the Related Art

Optical pickup devices are widely used in order to write/read information to/from optical recording media such as CD (Compact Disk) and DVD (Digital Versatile Disk). In the optical pickup device, after P-polarized light or S-polarized light emitted from a light source is converted into circularly-polarized light by a quarter wavelength plate, an advancing direction of the light is changed by a reflecting mirror or the like and the light is condensed onto an optical recording medium by an objective lens. After the circularly-polarized light which is reflected by the optical recording medium is converted into S-polarized light or P-polarized light by the quarter wavelength plate, the S or P-polarized light is detected as a light signal by a light detector.

U.S. Published Patent Application No. US2002/093902A1 discloses that in the case where two light sources are used, after optical paths from the respective light sources are synthesized by a dichroic prism, linearly polarized light from the light sources is converted into circularly-polarized light by a quarter wavelength plate.

In the optical pickup device disclosed in the above publication, light converted into circularly-polarized light is reflected by a deflection prism. A phase difference is generated between a P-polarized light component and an S-polarized light component at the time of reflection, and the reflected light may become elliptically-polarized light. Since the elliptically-polarized light does not become linearly-polarized light even when it transmits through the quarter wavelength plate, signal strength to the detector is decreased or return light to the light source is generated, resulting in a problem that laser oscillation becomes unstable. Further, not only when the light is reflected but also when the light transmits through an optical element, a phase difference is generally generated between the P-polarized light component and the S-polarized light component. For this reason, the optical element, which reflects or transmits the light converted into the circularly-polarized light, is required not only to satisfy spectroscopic properties such as reflectance and transmittance but also to prevent the generation of a phase difference.

Since the wavelength of light sources is being shortened in recent years, a so-called blue laser, whose laser beam has a wavelength of 400's nm which is shorter than a laser beam having a wavelength of 600's nm to be currently and mainly used in DVD, is being put into practical use. For this reason, optical pickup devices which are mounted with three light sources with wavelength of 700's nm (for CD), wavelength of 600's nm (for DVD) and wavelength of 400's nm (for example, for BD (Blu-ray Disk) or for HD DVD (High Definition DVD)) are being currently developed.

In the design of optical thin films which are formed on substrates of optical elements, however, when an optical pickup device, which satisfies the spectroscopic properties such as reflectance and transmittance for such light having three wavelength bands and simultaneously prevents the generation of a phase difference due to reflection and transmission, is tried to be obtained, it is difficult to design a satisfactory thin film constitution because of too many restriction conditions. For this reason, the thin film has been designed so that one of the spectroscopic properties and the phase difference properties is prioritized and the other is sacrificed.

SUMMARY OF THE INVENTION

It is an object of the present invention to satisfy both spectroscopic properties and phase difference properties in an optical member that reflects and/or transmits light.

It is also an object of the present invention to provide an optical pickup device in which light reflected from an optical recording medium enters a detector without decreasing intensity and return light to a light source is not generated.

The inventors of this invention made a keen examination in order to achieve the above objects and, as a result, devised the present invention based on an idea which is apparently simple but has not been tried by anybody. The idea is such that in order to maintain circularly-polarized light even after the circularly polarized light is reflected, a shift of a phase difference between a P-polarized light component and an S-polarized light component due to reflection is not made to be 0° but may be daringly 180°, namely, a rotating direction of the circularly polarized light may be reversed. That is to say, an optical element according to the present invention that reflects light has a substrate with a thin film which adjusts a phase difference of the light. The thin film adjusts a difference in phase differences between the P-polarized light component and the S-polarized light component of an incident light in a reflecting wavelength band and between the P-polarized light component and the S-polarized light component of a reflected light to 180°±10° at an absolute value. Now that, ±10° is an allowable range where a problem does not arise practically.

Further, an optical element that reflects and transmits light according to the present invention is formed with a thin film which adjusts a difference in phase differences between the P-polarized light component and the S-polarized light component of an incident light in the reflecting wavelength band and between the P-polarized light component and the S-polarized light component of the reflected light to 180°±10° at an absolute value.

The thin film may adjust the difference in phase differences between the P-polarized light component and the S-polarized light component of an incident light in a transmitting wavelength band and between the P-polarized light component and the S-polarized light component of the transmitted light to 0°±10° at an absolute value.

The optical pickup device according to the present invention has a reflecting mirror that reflects light from the light sources to the predetermined direction, and uses the above-mentioned optical element as the reflecting mirror.

Further, the optical pickup device according to the present invention has two or more light sources that emit light with different wavelengths, an objective lens that condenses the light onto a recording medium, a wavelength selecting filter that at least synthesizes optical paths from the light sources, and a detecting unit that detects the reflected light from the recording medium through the objective lens and the wavelength selecting filter, and uses the above-mentioned optical element as the wavelength selecting filter.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENT

One embodiment of the present invention is explained below with reference to the drawings.

Figure 1:
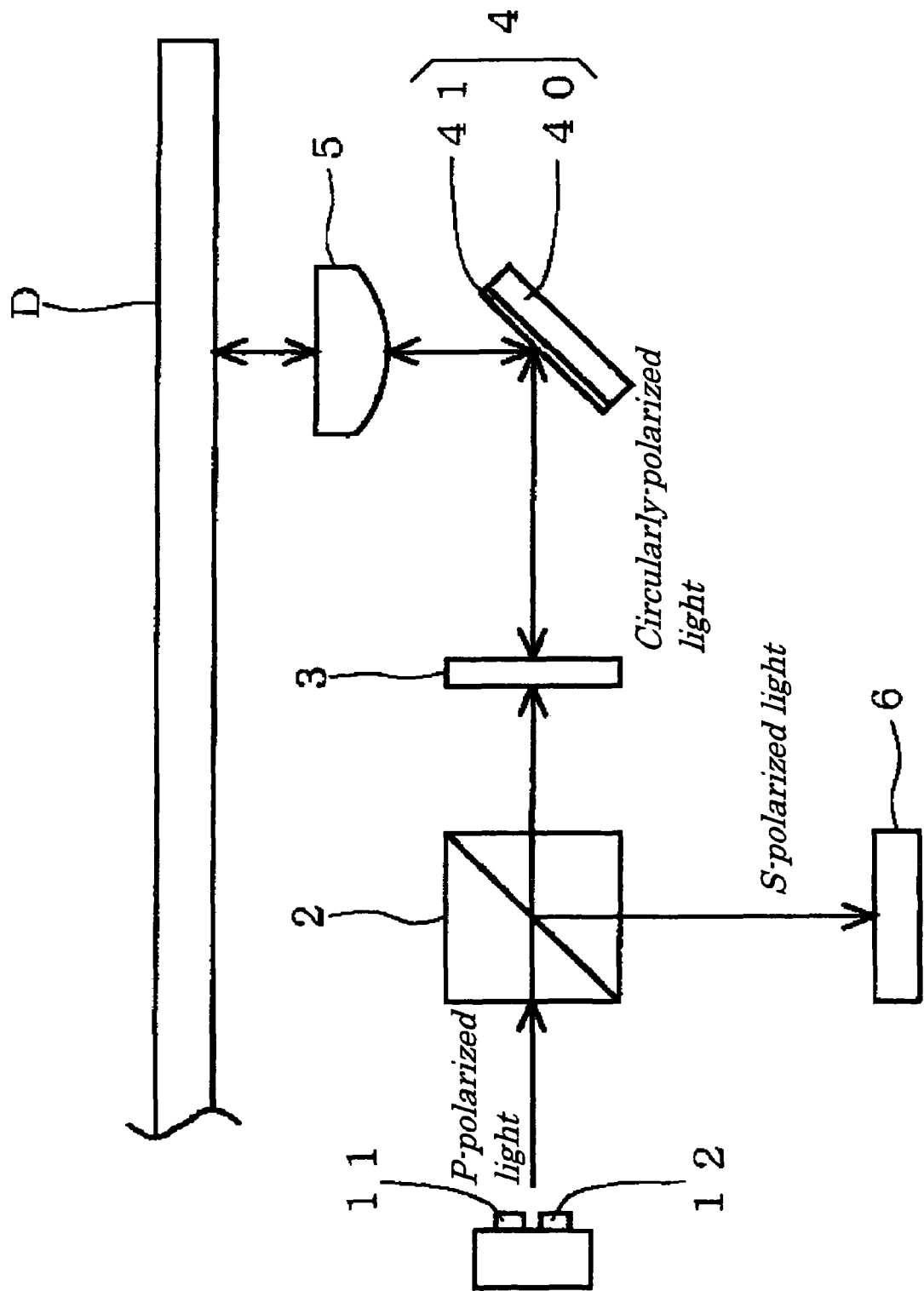
FIG. 1 is a schematic diagram illustrating one example of a reflecting mirror and an optical pickup device used therewith according to the present invention.

An optical element that reflects light and an optical pickup device used therewith according to the present invention are explained. FIG. 1 is a schematic constitutional diagram of a reflecting mirror (optical element) and an optical pickup device used therewith according to an embodiment of the present invention.

The optical pickup device in FIG. 1 has a light source 11 for BD with wavelength of 407 nm, a light source 12 for DVD with wavelength of 660 nm, a polarizing beam splitter 2, a quarter wavelength plate 3, a reflecting mirror 4, a pickup lens 5 and a photodiode (detecting unit) 6. The polarizing beam splitter 2 has a function which transmits light from the light sources 11 and 12 and reflects return light from an optical disc D. A substrate 40 of the reflecting mirror 4 is formed with a reflecting film 41, mentioned later. The reflecting mirror 4 is not limited to one shown in FIG. 1, and may be one which has a reflecting film on an inclined plane of a triangular prism and reflects light entering the prism. Further, the light sources 11 with wavelength of 407 nm is used as a light source for BD here, but the light source 11 is not limited to use for BD.

The laser beam which is emitted from the light source 11 or 12 transmits through the polarizing beam splitter 2 and is converted from P-polarized light into circularly-polarized light by the quarter wavelength plate 3. Thereafter, the circularly-polarized light is reflected by the reflecting film 41 of the reflecting mirror 4 so as to enter the pickup lens 5. At this time, due to the reflection from the reflecting film 41, a difference in phase differences between a P-polarized light component and an S-polarized light component at the time of incidence and between the P-polarized light component and the S-polarized light component after reflection becomes 180°. As a result, its rotating direction is reversed but the circularly-polarized light is maintained and does not become elliptically-polarized light. The light is condensed on a signal recording surface of the rotating optical disk D by the pickup lens 5, so that an optical spot is formed. Meanwhile, the reflected light (return light) from the optical disc D goes along an optical path which is opposite to an approach route. That is to say, the return light passes through the pickup lens and is reflected by the reflecting mirror 4. Similarly to the case of the approach route, a difference in the phase differences between the P-polarized light component and the S-polarized light component at the time of incidence and reflection becomes 180° due to the reflection by the reflecting film 41, so that the rotating direction of the circularly-polarized light is reversed. Eventually, since a phase difference of 360° is given to the light on the approach and return routes by the reflecting film 41, the polarizing state is not changed. The circularly-polarized light is converted into the S-polarized light by the quarter wavelength plate 3 so as to enter the polarizing beam splitter 2. Since the polarizing beam splitter 2 transmits the P-polarized light but reflects the S-polarized light, the return light is reflected so as to be led to the photodiode 6, and a signal is detected.

In this embodiment, the laser light emitted from the light source 11 or 12 is the P-polarized light, but needless to say, may be the S-polarized light. When the light emitted from the light sources 11 and 12 is the S-polarized light, the S-polarized light is converted into circularly-polarized light by the quarter wavelength plate 3. The return light again passes the quarter wavelength plate 3 so that the circularly-polarized light is converted into the P-polarized light. For this reason, the light sources and the photodiode may be counterchanged.

The concrete constitution of the reflecting film 41, which sets the difference in the phase differences between the P-polarized light component and the S-polarized light component before reflection and between the P-polarized light component and the S-polarized light component after reflection to 180°, may be calculated by the conventionally-known film constitution designing software. As the reflecting film 41 which can be used in the present invention, for example, a constitution shown in Table 1 is illustrated. Reflecting properties and a reflecting phase difference of the reflecting film 41 are shown in FIGS. 2 and 3.

Figure 2:
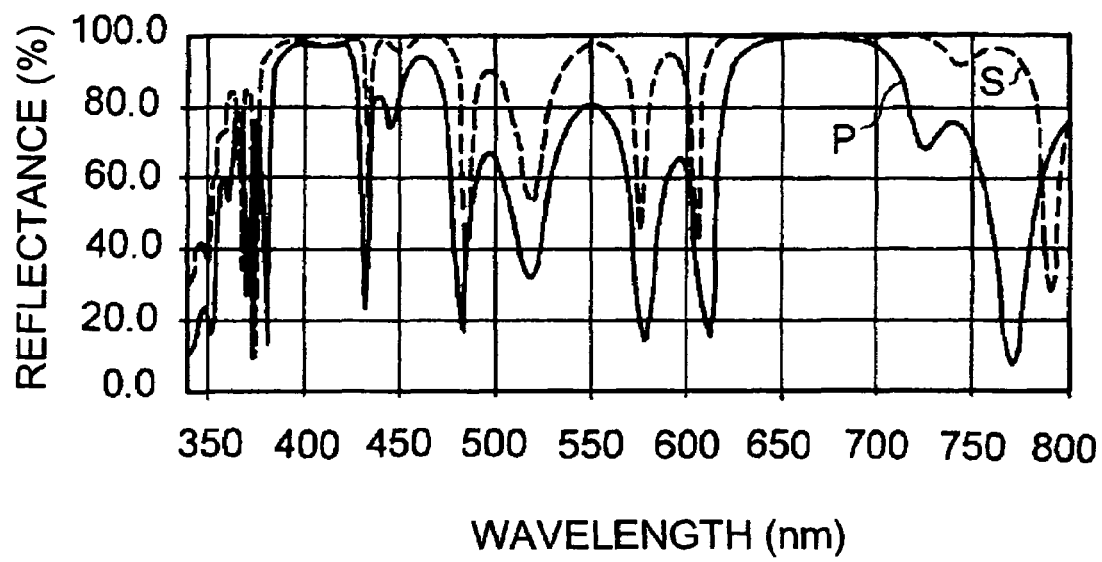
FIG. 2 is a graph illustrating a reflecting property of a reflecting film in Table 1.
Figure 3:
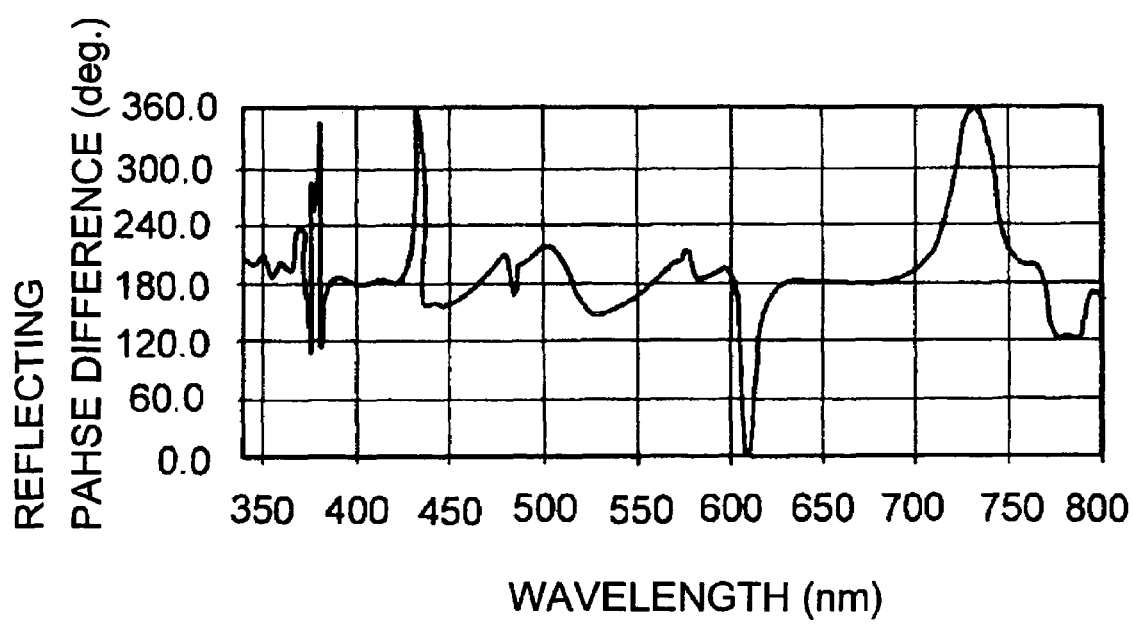
FIG. 3 is a graph illustrating a reflecting phase difference of the reflecting film in Table 1.

As is clear from FIG. 2, the reflectance of the P-polarized light component and the S-polarized light component obtains a value which is close to 100% at wavelength of 407 nm (light source for BD) and wavelength of 660 nm (light source for DVD). As is clear from FIG. 3, the difference in the phase differences is 180° before and after reflection at wavelength of 407 nm (light source for BD) and wavelength of 660 nm (light source for DVD). The reflecting mirror 4, therefore, where the reflecting film 41 having the above constitution is formed on the substrate 40, reflects the light with wavelengths of 407 nm (light source for BD) and 660 nm (light source for DVD) approximately 100%. Further, the phase difference before and after reflection is adjusted to 180° by the reflecting mirror 4. That is to say, the circularly-polarized light is reflected as the circularly-polarized light whose rotating direction is reversed.

Figure 4:
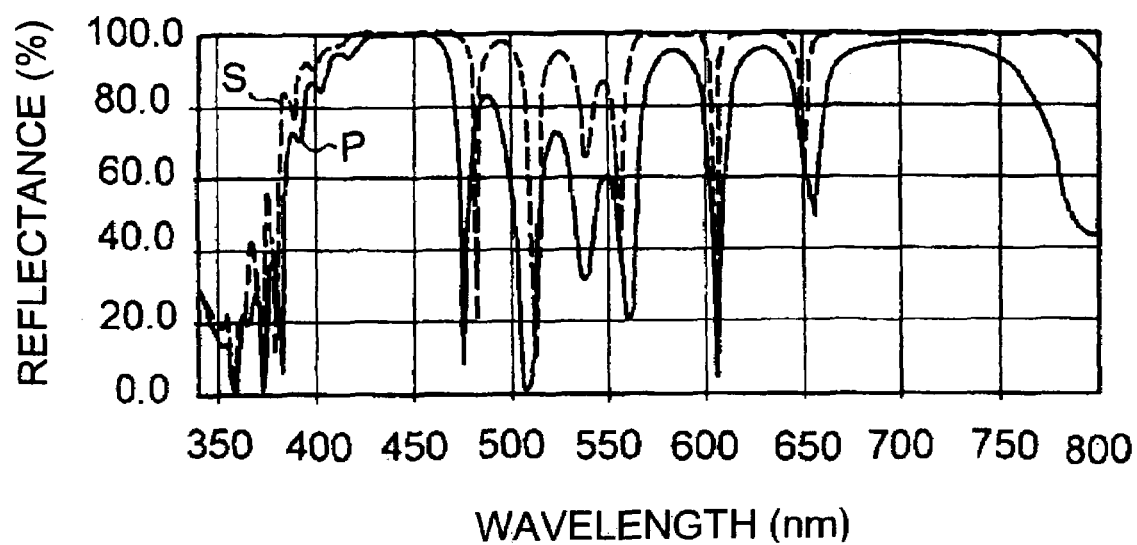
FIG. 4 is a graph illustrating reflecting properties of the reflecting film in Table 2.
Figure 5:
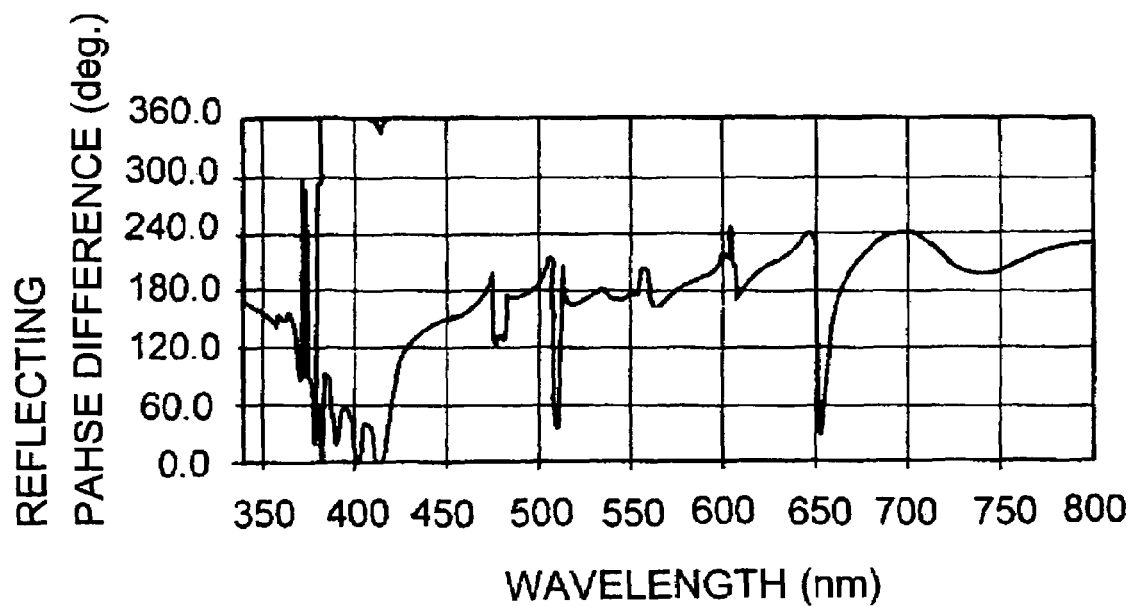
FIG. 5 is a graph illustrating a reflecting phase difference of the reflecting film in Table 2.

On the other hand, for comparison, Table 2 shows a constitutional example of a reflecting film, which is calculate by using the same film constitution designing software and where the phase difference as design target is substituted 0° for 180°. FIGS. 4 and 5 show the reflecting properties and the reflecting phase difference of this reflecting film.

As is clear from FIG. 4, the reflectance of the P-polarized light component is about 90% at wavelength of 407 nm (light source for BD), and the reflectance of the S-polarized light component is about 93%. Meanwhile, at wavelength of 660 nm (light source for DVD), the reflectance of the P-polarized light component is about 50%, and the reflectance of the S-polarized light component is nearly 100%. Since the reflectance required for practical use is normally 95% or more, the thin film having this constitution cannot be used as the reflecting film. Further, as is clear from FIG. 5, the difference in the phase differences at wavelength of 407 nm (light source for BD) before and after reflection is approximately 40° although the target setting is 0°. Further, the phase difference at wavelength of 660 nm (light source for DVD) before and after reflection is 0°, but since the reflecting phase difference at wavelength of before and after 660 nm abruptly fluctuates, this film lacks quality stability.

Figure 6:
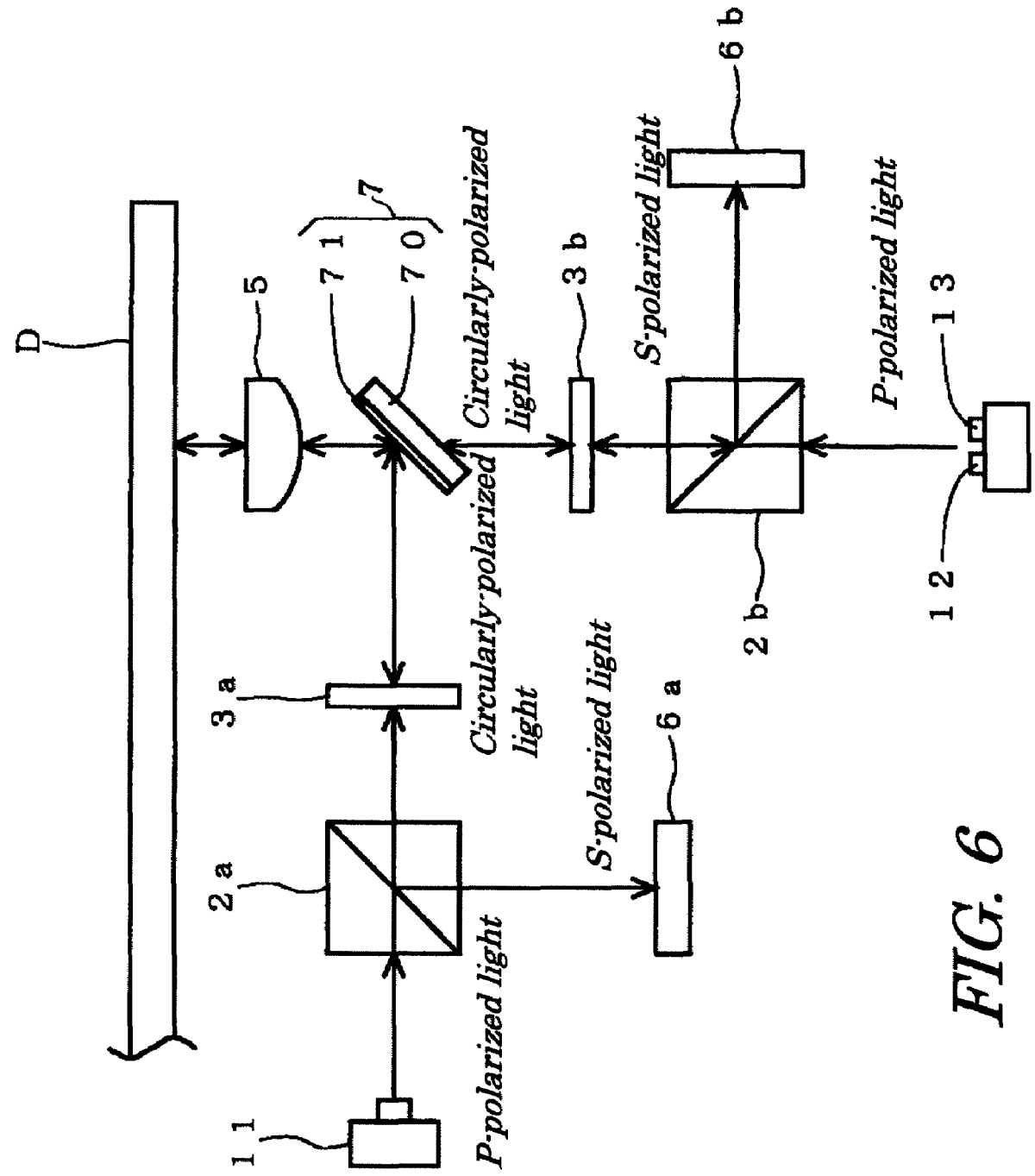
FIG. 6 is a schematic diagram illustrating a wavelength selecting filter and an optical pickup device used therewith according to the present invention.

The optical element that reflects and transmits light and the optical pickup device used therewith are explained below. FIG. 6 is a schematic constitutional diagram of a wavelength selecting filter as the optical element and the optical pickup device used therewith is according to the present invention.

The optical pickup device in FIG. 6 has three light sources (light source for BD (wavelength of 407 nm) 11, light source for DVD (wavelength of 660 nm) 12, and light source for CD (wavelength of 787 nm) 13), polarizing beam splitters 2a and 2b, quarter wavelength plates 3a and 3b, a wavelength selecting filter (optical element) 7, a pickup lens 5, and photodiodes (detecting units) 6a and 6b. The polarizing beam splitters 2a and 2b have the function for transmitting one of the P-polarized light and the S-polarized light and reflects the other one similarly to the above-mentioned polarizing beam splitter, and thus they transmit light from the light sources and reflect return light from an optical disc D. The wavelength selecting filter 7 has a wavelength selecting film (thin film) 71 which is formed on the substrate 70 and selectively reflects and transmits light. The constitution of the wavelength selecting film 71 will be mentioned later. The wavelength selecting filter 7 may be formed into a cube shape such that the wavelength selecting film is formed on an inclined plane of a triangular prism and this triangular prism joins the other triangular prism in the opposite inclined planes thereof.

The laser beam emitted from the light source for BD 11 with wavelength of 407 nm transmits through the polarizing beam splitter 2a, and after the P-polarized light is converted into circularly-polarized light by the quarter wavelength plate 3a, the circularly-polarized light is reflected by the wavelength selecting filter 7 so as to enter the pickup lens 5. At this time, the difference in the phase differences between the P-polarized light component and the S-polarized light component converted into the circularly-polarized light (difference in the phase differences before and after reflection) becomes 180° due to the reflection by the wavelength selecting film 71 formed on the wavelength selecting filter 7. As a result, the rotating direction is reversed, but the circularly-polarized light is maintained so as not to become elliptically-polarized light. The pickup lens 5 condenses the light onto a signal recording surface of the rotating optical disc D, so that an optical spot is formed. Meanwhile, the return light from the optical disc D goes along an optical path reversed to the approach route and passes through the pickup lens 5 so as to be reflected by the wavelength selecting filter 7. At this time, similarly to the case of the approach route, the phase difference of the circularly-polarized light becomes 180° due to the reflection by the wavelength selecting film 71, and the rotating direction of the circularly-polarized light is reversed. Eventually, since a phase difference of 360° is given to the light on the approach and return routes by the wavelength selecting film 71, the polarizing state does not change. The circularly-polarized light is converted into the S-polarized light by the quarter wavelength plate 3a, and the S-polarized light enters the polarizing beam splitter 2a. Since the polarizing beam splitter 2a transmits the P-polarized light but reflects the S-polarized light, the return light is reflected to be led to the photodiode 6a, and a signal is detected.

Meanwhile, the laser beam emitted from the light source 12 for DVD with wavelength of 660 nm or the light source 13 for CD with wavelength of 787 nm transmits through the polarizing beam splitter 2b, and is converted from the P-polarized light into the circularly-polarized light by the quarter wavelength plate 3b. The circularly-polarized light transmits through the wavelength selecting filter 7 so as to enter the pickup lens 5. By transmitting through the wavelength selecting film 71 formed on the wavelength selecting filter 7, the difference in the phase differences between the P-polarized light component and the S-polarized component of the light converted into the circularly-polarized light becomes 0° here. As a result, the circularly-polarized light in this state transmits therethrough. The lens pickup 5 condenses the light onto the signal recording surface of the rotating optical disc D, so that the optical spot is formed. Meanwhile, the return light from the optical disc D passes through the pickup lens 5 so as to again transmit through the wavelength selecting filter 7. At this time, similarly to the case on the approach route, the difference in the phase differences of the circularly-polarized light due to transmission through the wavelength selecting film 71 becomes 0°, and the circularly-polarized light directly transmits through the wavelength selecting filter 7. The circularly polarized light is converted into the S-polarized light by the quarter wavelength plate 3b, and enters the polarizing beam splitter 2b. Since the polarizing beam splitter 2b transmits the P-polarized light but reflects the S-polarized light, the return light is reflected to be led to the photodiode 6b, and the signal is detected.

Figure 7:
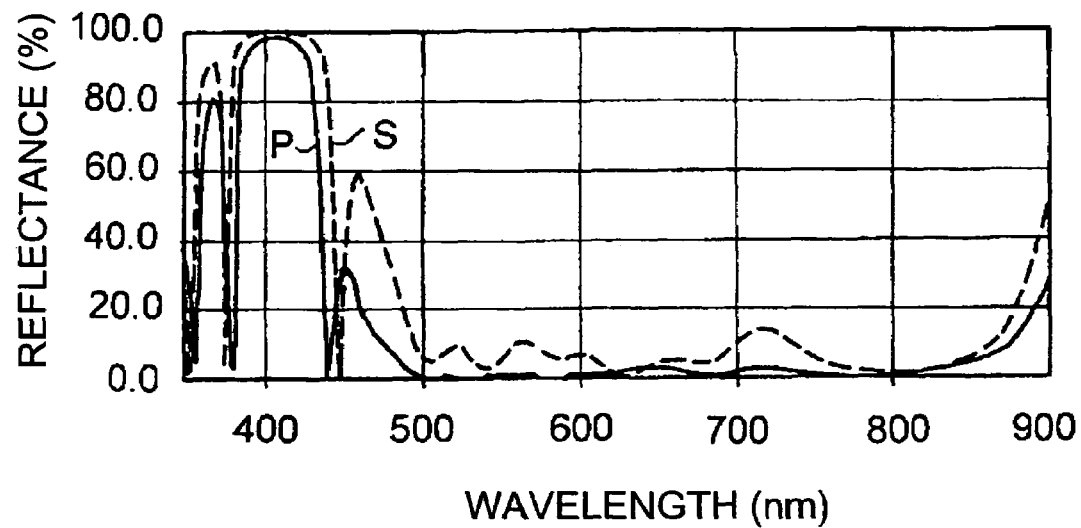
FIG. 7 is a graph illustrating reflecting properties of a wavelength selecting film in Table 3.
Figure 8:
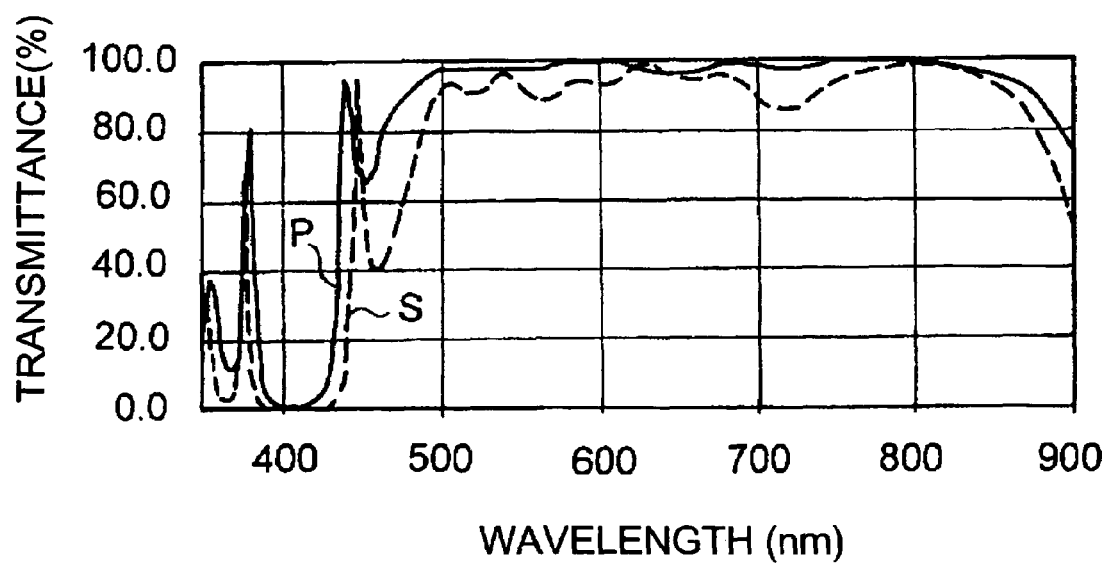
FIG. 8 is a graph illustrating transmitting properties of the wavelength selecting film in Table 3.

The concrete constitution of the wavelength selecting film 71 formed on the substrate 70 of the wavelength selecting filter 7 may be calculated by using the conventionally-known film designing software. As the wavelength selecting film 71 which can be used in this embodiment, for example, Table 3 shows a constitution. FIGS. 7 and 8 show the reflecting and the transmitting properties of the wavelength selecting film 71, and FIGS. 9 and 10 show the phase differences of reflection and transmission, respectively.

As is clear from FIGS. 7 and 8, in the wavelength selecting film 71, at wavelength of 407 nm (light source for BD), the reflectance of the P-polarized light component and the S-polarized light component is approximately 100%, and the transmittance is 0%. Meanwhile, at wavelength of 660 nm (light source for DVD) and wavelength of 787 nm (light source for CD), the reflectance of the P-polarized light component and the S-polarized light component is less than 10%, and the transmittance is 90% or more. This wavelength selecting film 71 reflects the light with wavelength of 407 nm, and transmits the light with wavelength of 660 nm and 787 nm.

Figure 9:
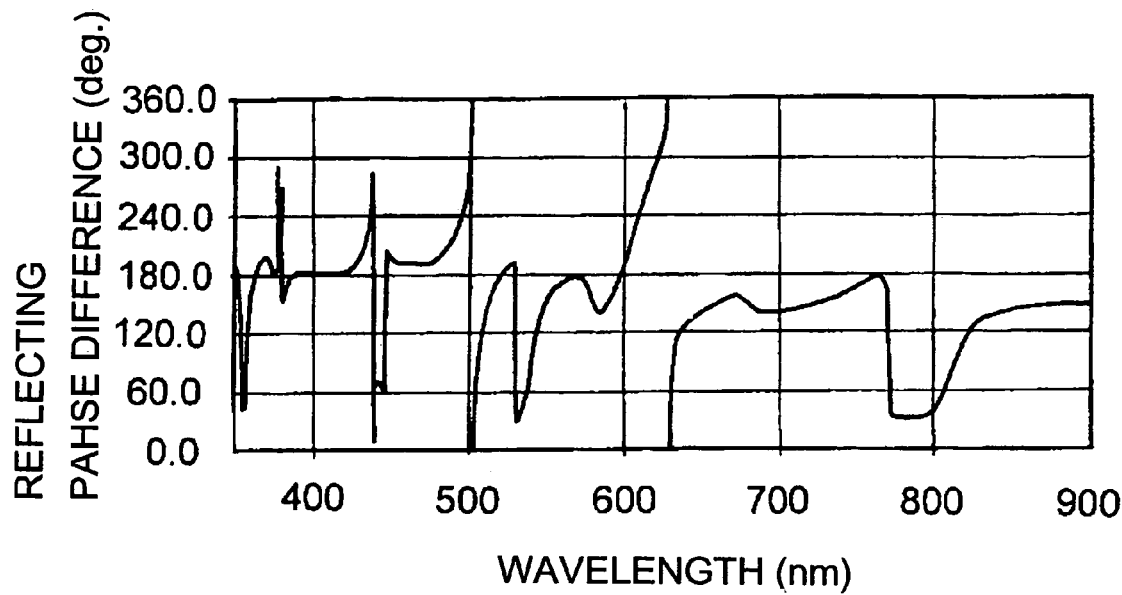
FIG. 9 is a graph illustrating a reflecting phase difference of the wavelength selecting film in Table 3.
Figure 10:
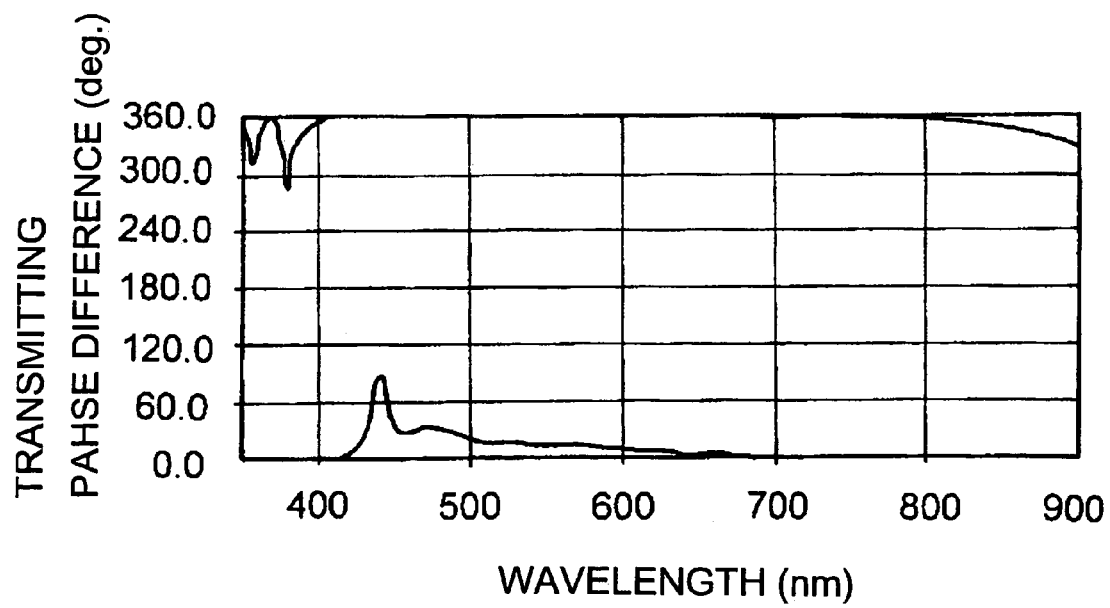
FIG. 10 is a graph illustrating a transmitting phase difference of the wavelength selecting film in Table 3.

As to the phase difference properties of the wavelength selecting film 71, as is clear from FIG. 9, the difference in the phase differences before and after the reflection at wavelength of 407 nm (light source for BD) is 180°. As is clear from FIG. 10, the difference in the phase differences before and after the transmission at wavelengths of 660 nm (light source for DVD) and 787 nm (light source for CD) is 0° (360°).

In this embodiment, as the wavelength selecting film 71 formed on the substrate 70 of the wavelength selecting filter 7, a wavelength selecting film where the difference in the phase differences before and after transmission is 0° is used, but a wavelength selecting film where the difference in the phase differences before and after transmission is 180° may be used.

Figure 11:
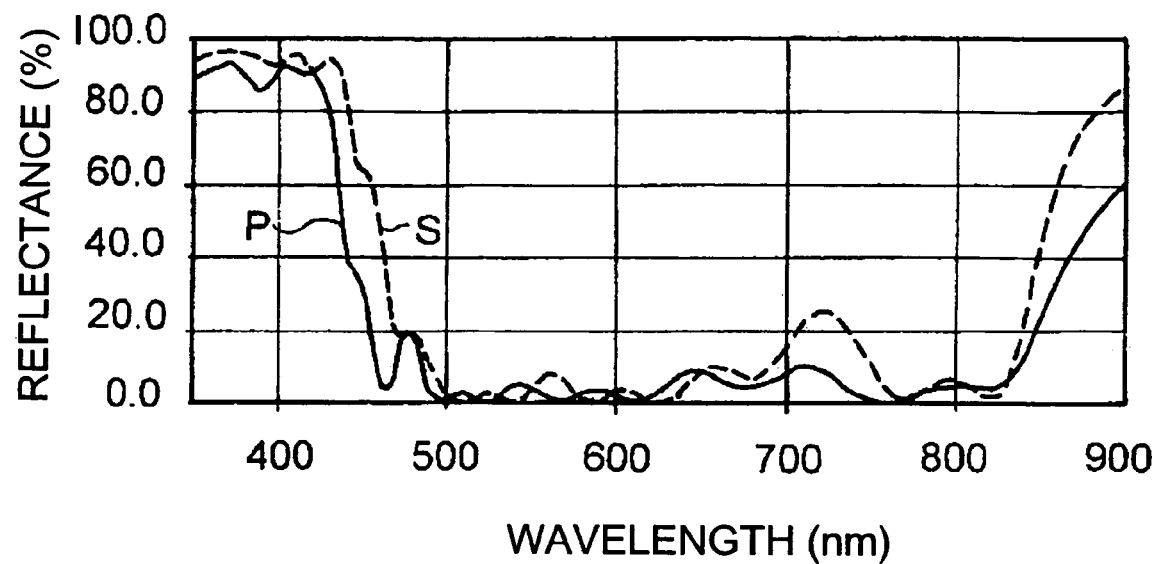
FIG. 11 is a graph illustrating reflecting properties of a wavelength selecting film in Table 4.
Figure 12:
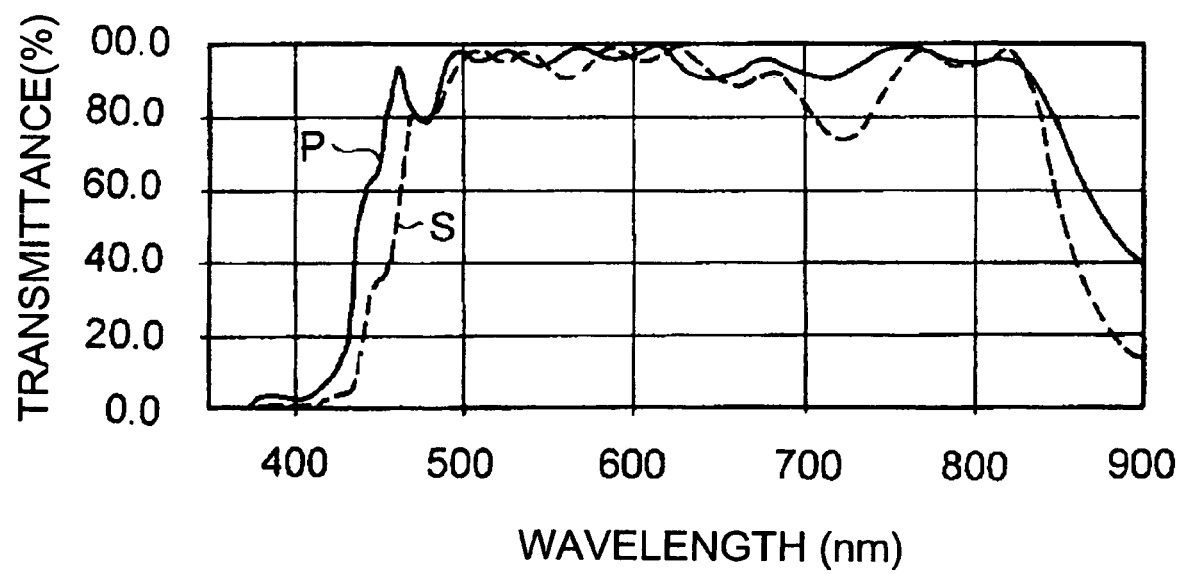
FIG. 12 is a graph illustrating transmitting properties of the wavelength selecting film in Table 4.

On the other hand, for comparison, Table 4 shows a constitutional example of the wavelength selecting film, which is calculated by the same film constitution designing software and where the difference in the phase differences due to reflection as the design target is substituted 0° for 180°. FIGS. 11 and 12 show the reflecting and the transmitting properties of the wavelength selecting film, and FIGS. 13 and 14 show the reflecting and transmitting phase differences, respectively.

As is clear from FIGS. 11 and 12, in this wavelength selecting film, at wavelength of 407 nm (light source for BD), the reflectance of the P-polarized light component and the S-polarized light component is 90% or more, and the transmittance is less than 5%. Meanwhile, at wavelengths of 660 nm (light source for DVD) and 787 nm (light source for CD), the reflectance of the P-polarized light component and the S-polarized light component is less than 10%, and the transmittance is 90% or more. The reflectance and the transmittance, however, in the vicinities of the wavelengths of 660 nm and 787 nm greatly fluctuate, thereby raising a problem of the quality stability.

Figure 13:
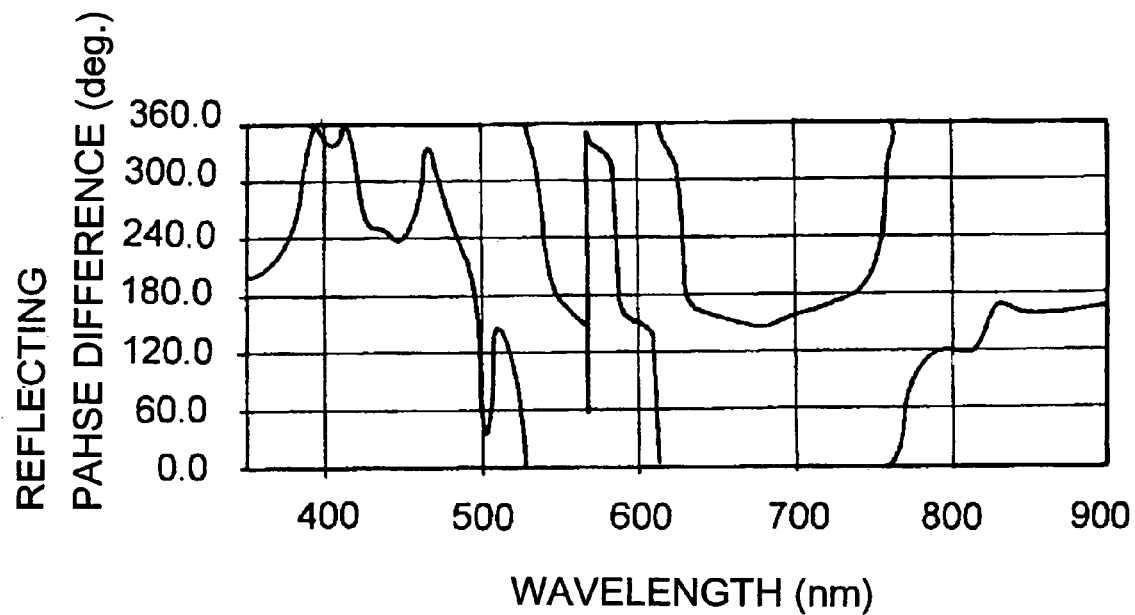
FIG. 13 is a graph illustrating a reflecting phase difference of the wavelength selecting film in Table 4.
Figure 14:
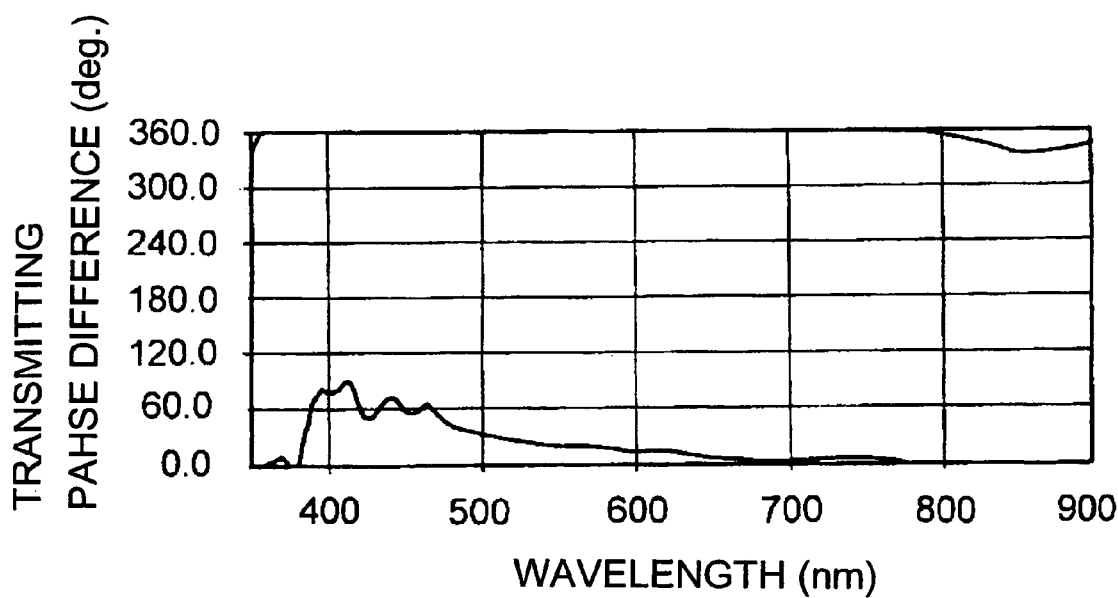
FIG. 14 is a graph illustrating a transmitting phase difference of the wavelength selecting film in Table 4.

As to the phase difference properties of the wavelength selecting film, as is clear from FIG. 13, the difference in the phase differences before and after reflection at wavelength of 407 nm (light source for BD) is −20° (340°), and does not become 0° which is a target value. As is clear from FIG. 14, the difference in the phase differences before and after transmission at wavelengths of 660 nm (light source for DVD) and 787 nm (light source for CD) is less than 10°. Since the output from the light source with wavelength of 407 nm (light source for BD) is the weakest in the above-mentioned three light sources, it is practically necessary that the difference in the phase differences before and after reflection at this wavelength is nearly 0°. At this point, therefore, the wavelength selecting film having this constitution was not suitable for practical use.

Figure 15:
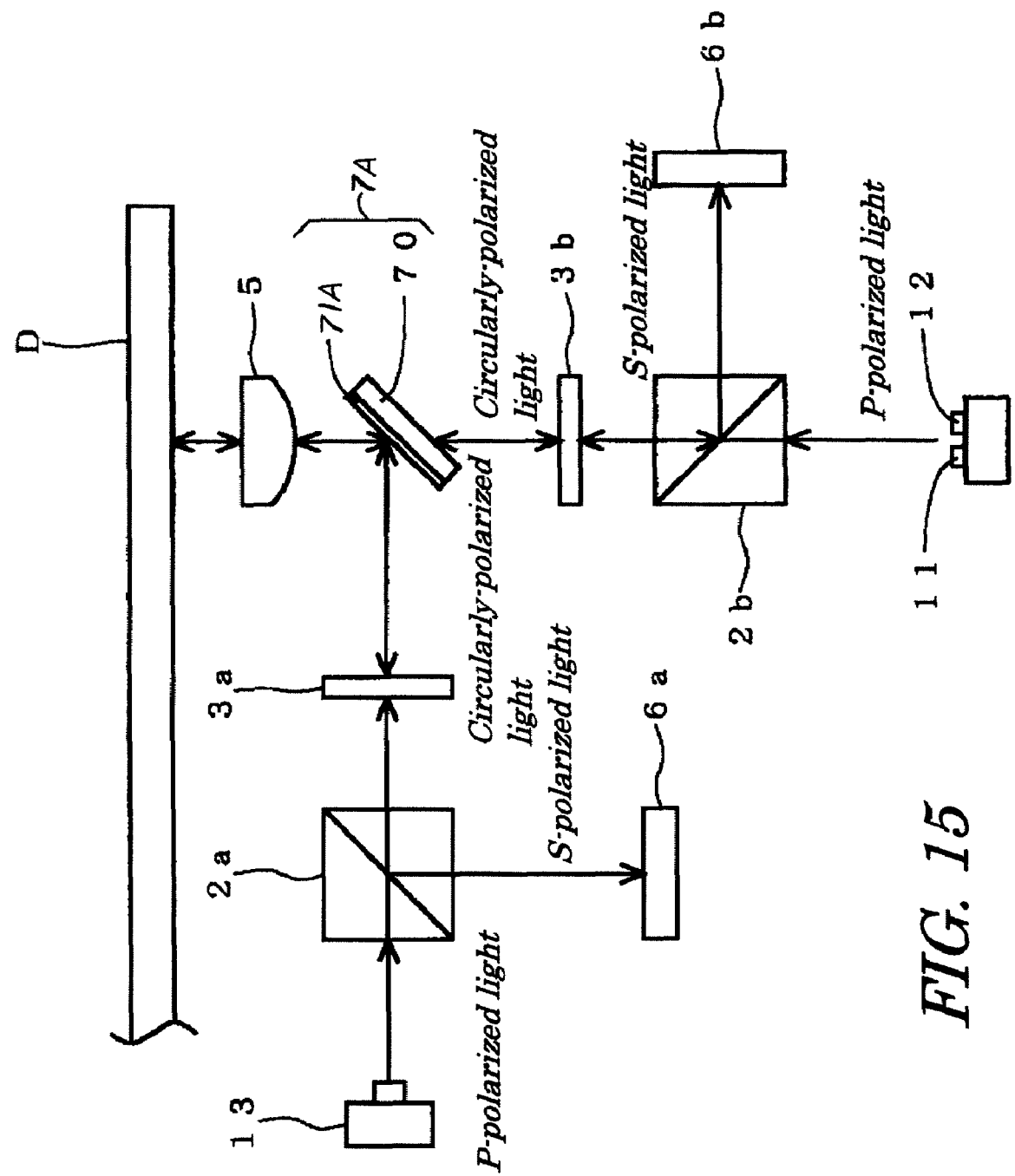
FIG. 15 is a schematic diagram illustrating another example of the wavelength selecting filter and the optical pickup device used there with according to the present invention.

FIG. 15 shows another embodiment of the optical pickup device using three light sources (wavelength of 407 nm (light source for BD), wavelength of 660 nm (light source for DVD), and wavelength of 787 nm (light source for CD)). A difference of the optical pickup device in this drawing from the device in FIG. 6 is that wavelengths at which the wavelength selecting filter 7A reflects and transmits light are different. That is to say, in the optical pickup device in FIG. 15, the wavelength selecting filter 7A reflects the light with wavelength of 787 nm, and transmits light with wavelengths of 407 nm and 660 nm. Since the basic constitution of the device is the same as that in FIG. 6, the explanation thereof is omitted, and the constitution of the wavelength selecting film 71A to be formed on the substrate of the wavelength selecting filter is explained below.

Figure 16:
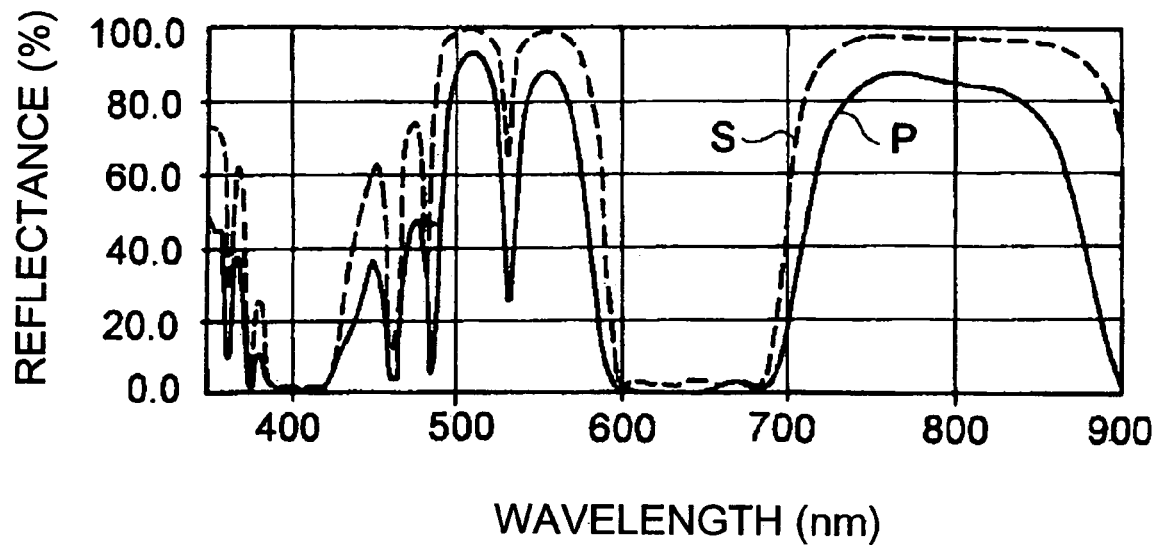
FIG. 16 is a graph illustrating reflecting properties of a wavelength selecting film in Table 5.
Figure 17:
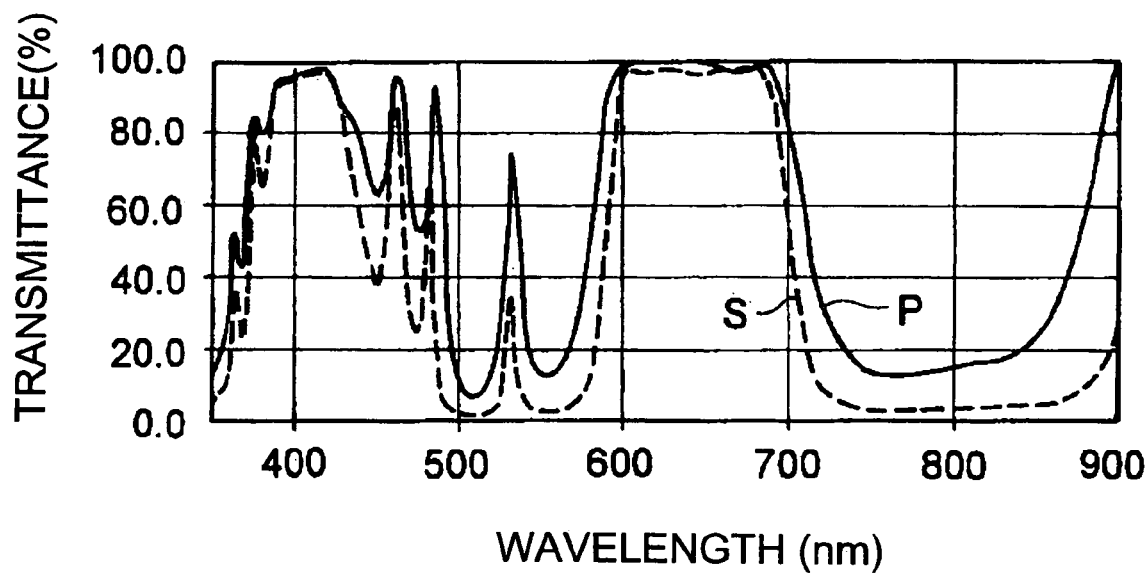
FIG. 17 is a graph illustrating transmitting properties of the wavelength selecting film in Table 5.

The concrete constitution of the wavelength selecting film 71A to be formed on the substrate 70 of the wavelength selecting filter 7A may be calculated by using the conventionally known film constitution designing software so that light with wavelength of 787 nm is reflected, light with wavelengths of 407 nm and 660 nm is transmitted, a reflection phase difference is 180°, and a transmission phase difference is 0°. Table 5 shows an example of the calculated wavelength selecting film. FIGS. 16 and 17 show the reflecting and the transmitting properties of the wavelength selecting film 71A, and FIGS. 18 and 19 show the reflecting and the transmitting phase differences, respectively.

A mixing ratio of $La_2O_3$ and $Al_2O_3$ is 1:1.2 at molar ratio. Concretely, Substance M3 made by Merck KGaA, Germany was used.

As is clear from FIGS. 16 and 17, in the wavelength selecting film 71A, at wavelength of 787 nm (light source for CD), the reflectance of the P-polarized light component is about 90%, the reflectance of the S-polarized light component is about 98%, the transmittance of the P-polarized light component is about 12%, and the transmittance of the S-polarized light component is about 5%. Meanwhile, at wavelengths of 407 nm (light source for BD) and 660 nm (light source for DVD), the reflectance of the P-polarized light component and the S-polarized light component is approximately 0%, and their transmittance is 95% or more. In this wavelength selecting film 71A, the reflectance of the light at wavelength of 787 nm is slightly low and the transmittance is slightly high, but this film does not have a serious problem for practical use. The wavelength selecting film 71A reflects the light with wavelength of 787 nm and transmits the light with wavelength of 407 nm and the light with wavelength of 660 nm.

Figure 18:
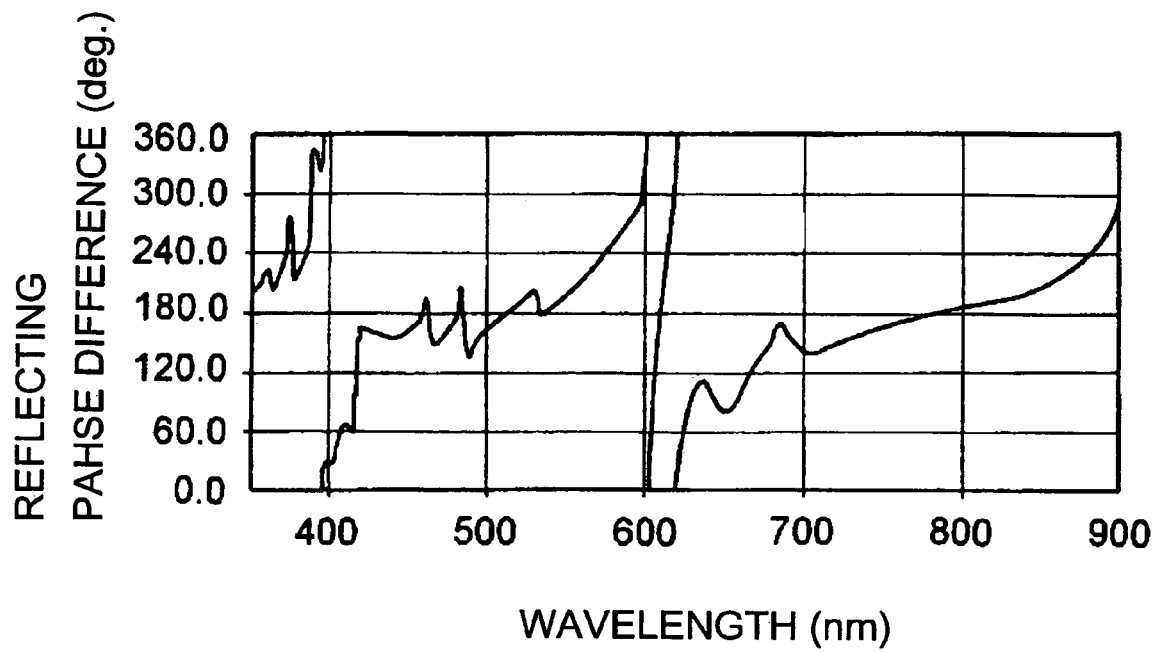
FIG. 18 is a graph illustrating a reflecting phase difference of the wavelength selecting film in Table 5.
Figure 19:
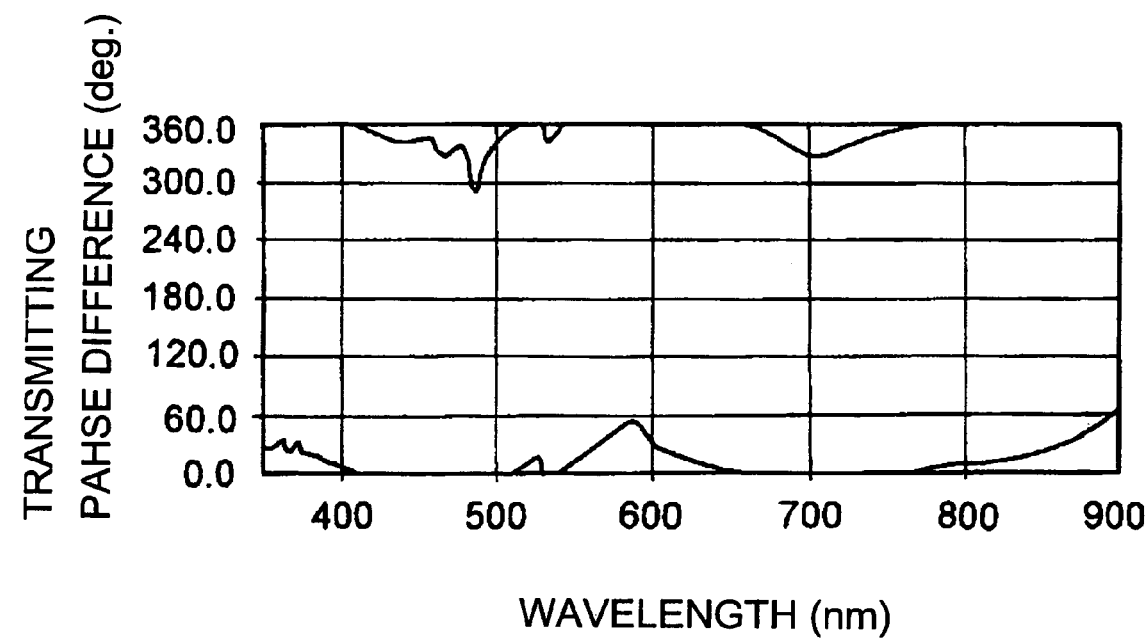
FIG. 19 is a graph illustrating a transmitting phase difference of the wavelength selecting film in Table 5.

As to the phase difference properties of the wavelength selecting film 71A, as is clear from FIG. 18, the difference in the phase differences before and after reflection at wavelength of 787 nm (light source for CD) is 180°. As is clear from FIG. 19, the difference in the phase differences before and after transmission at wavelengths of 407 nm (light source for BD) and 660 nm (light source for DVD) is 0° (360°).

In this embodiment, as the wavelength selecting film 71A to be formed on the substrate 70 of the wavelength selecting filter 7A, a wavelength selecting film where the difference in the phase differences before and after transmission is 0° was used, but a wavelength selecting film where the difference in the phase differences before and after transmission is 180° may be, needless to say, used.

Figure 20:
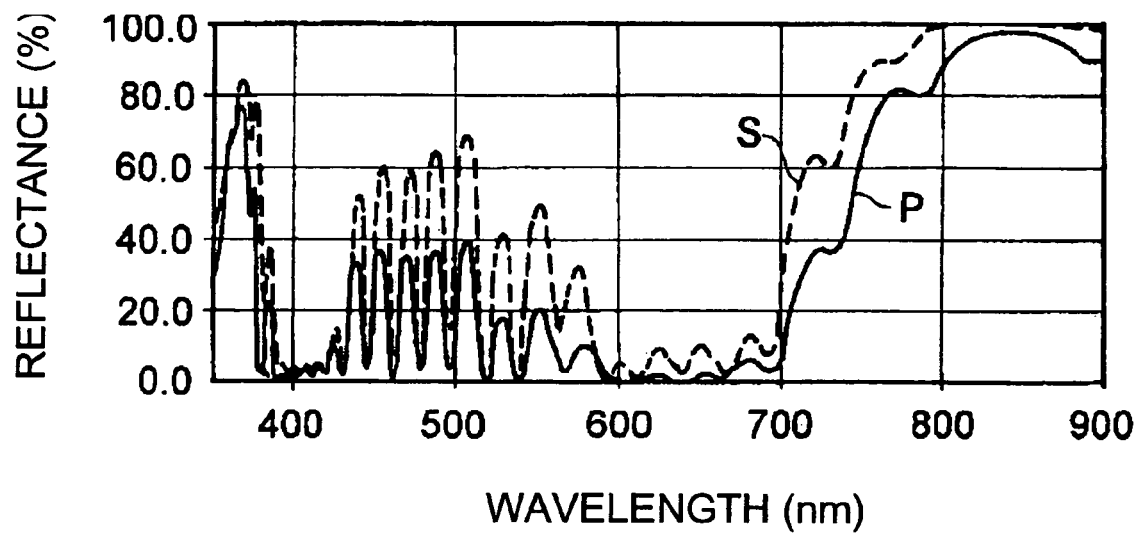
FIG. 20 is a graph illustrating reflecting properties of the wavelength selecting film in Table 6.
Figure 21:
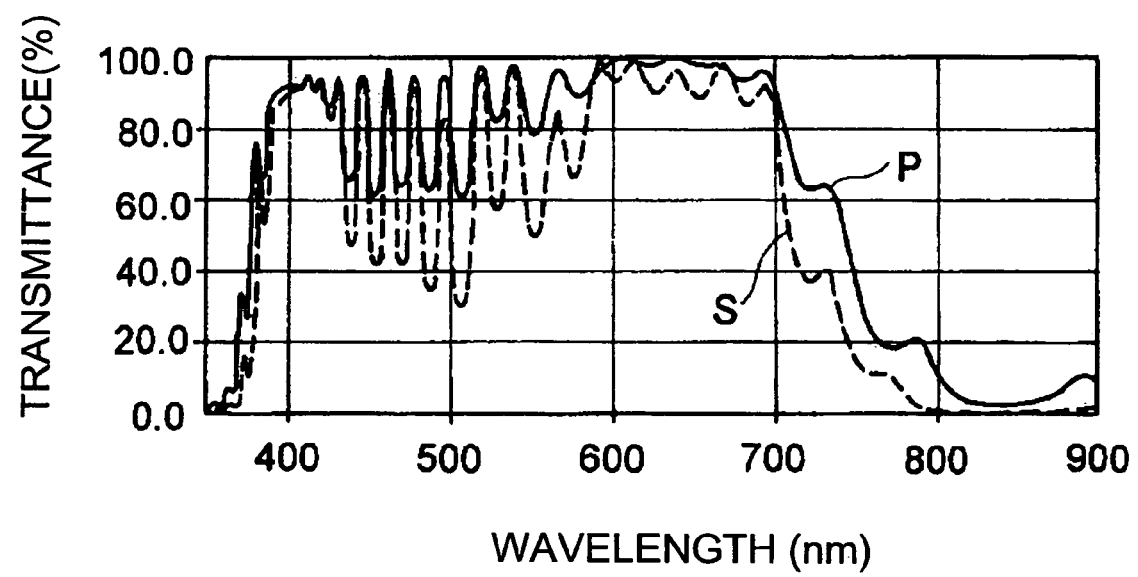
FIG. 21 is a graph illustrating transmitting properties of the wavelength selecting film in Table 6.

For comparison, Table 6 shows a constitutional example of the wavelength selecting film, which is calculated by using the same film constitution designing software and where the difference in the phase differences due to reflection as the design target is substituted 0° for 180°. FIGS. 20 and 21 show the reflecting and the transmitting properties of this wavelength selecting film, and FIGS. 22 and 23 show the reflecting and the transmitting phase differences, respectively.

A mixing ratio of $La_2O_3$ and $Al_2O_3$ is 1:1.2 at molar ratio. Concretely, Substrate M3 made by Merck KGaA, Germany was used.

As is clear from FIGS. 20 and 21, in this wavelength selecting film, at wavelength of 787 nm (light source for CD), the reflectance of the P-polarized light component is about 80%, and the reflectance of the S-polarized light component is about 90%. Further, the transmittance of the P-polarized light component is about 20%, and the transmittance of the S-polarized light component is about 10%. Meanwhile, at wavelengths of 407 nm (light source for BD) and 660 nm (light source for DVD), the reflectance of the P-polarized light component and the S-polarized light component is 10% or less. Further, the transmittance of the P-polarized light component and the S-polarized light component is about 90%. Both the reflectance and the transmittance, however, greatly fluctuate in the vicinity of wavelength of 660 nm, thereby raising a problem of quality stability.

Figure 22:
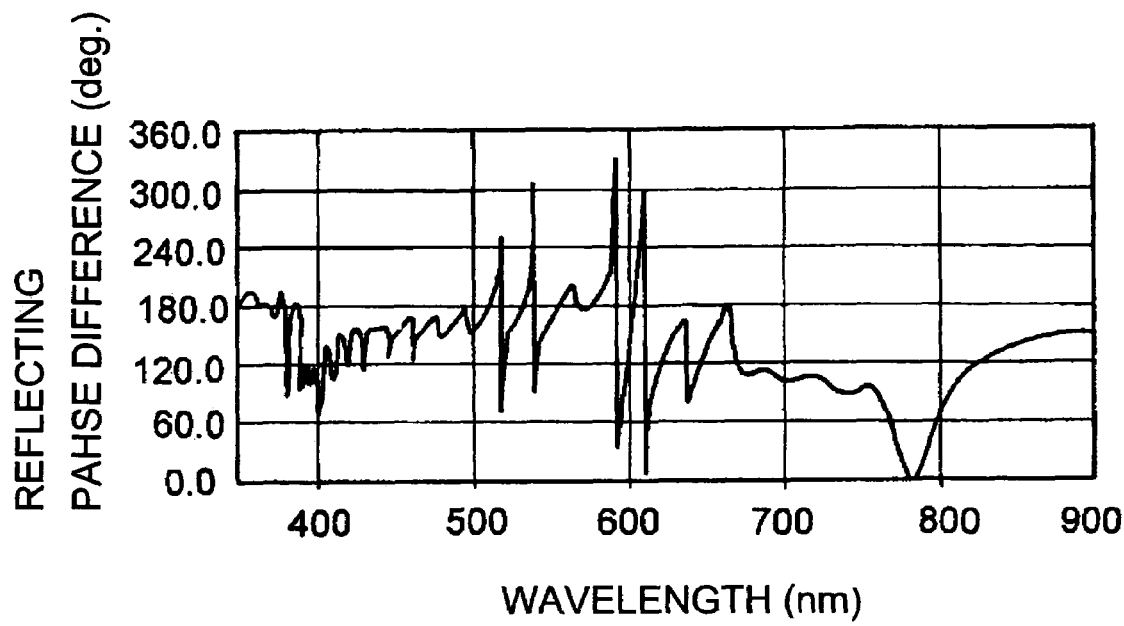
FIG. 22 is a graph illustrating a reflecting phase difference of the wavelength selecting film in Table 6.
Figure 23:
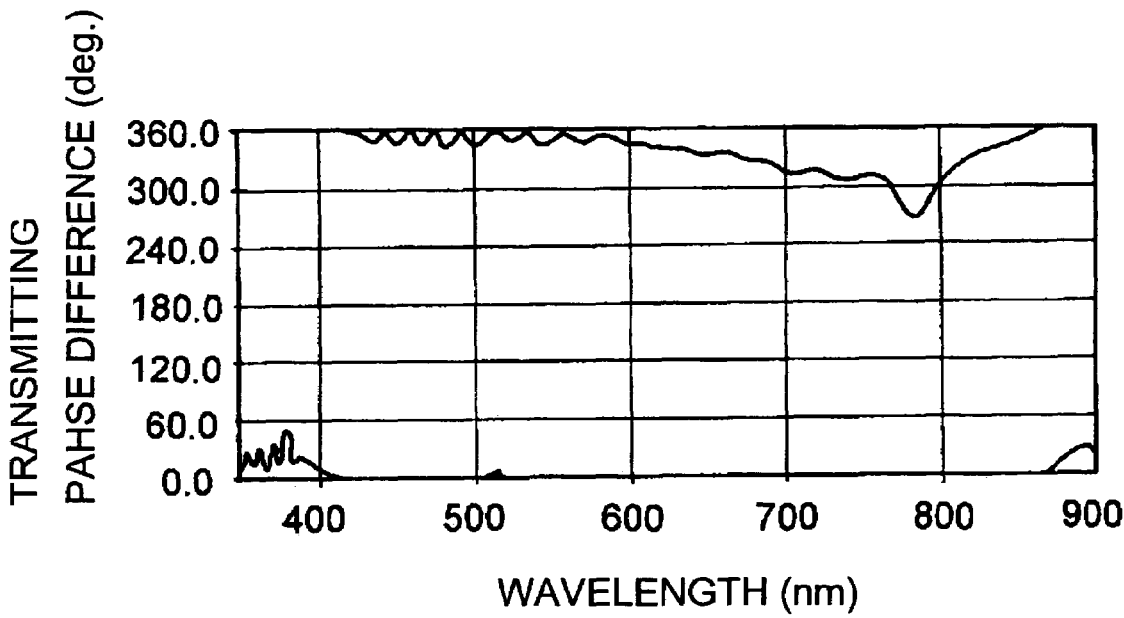
FIG. 23 is a graph illustrating a transmitting phase difference of the wavelength selecting film in Table 6.

As to the phase difference properties of this wavelength selecting film, as is clear from FIG. 22, the difference in the phase differences before and after reflection at wavelength of 787 nm (light source for CD) is 0°, but the difference in the phase differences in the vicinity of 787 nm abruptly changes, and thus this wavelength selecting film lacks the quality stability. Further, as is clear from FIG. 23, the difference in the phase differences before and after transmission at wavelength of 407 nm (light source for BD) is less than 10°, but the difference in the phase differences before and after transmission at wavelength of 660 nm (light source for DVD) is −30° (330°), namely, does not become 0° which is a target value.

According to the present invention, the optical element that at least reflects light has the thin film which adjusts the difference in the phase differences between the P-polarized light component and the S-polarized light component before light in a reflecting wavelength band enters and between the P-polarized light component and the S-polarized light component after reflection to 180°±10° at absolute value. Now that, ±10° is an allowable range where a problem does not arise practically.

In other words, the thin film reflects light in a predetermined reflection wavelength band so that the following condition is satisfied, $$170° \leq |\Delta_{incidence} - \Delta_{reflection}| \leq 190°$$

where $\Delta_{incidence}$ represents a phase difference between P-polarized light component and S-polarized light component of the incident light to the thin film, and $\Delta_{reflection}$ represents a phase difference between P-polarized light component and S-polarized light component of the light reflected by the thin film.

For this reason, the light converted into the circularly-polarized light can be effectively reflected, and the circularly-polarized light can be maintained after reflection.

In the case where the optical element reflects and transmits light, the thin film can adjust the difference in the phase differences between the P-polarized light component and the S-polarized light component before the light in the transmitting wavelength band enters and between the P-polarized light component and the S-polarized light component after transmission to 0°±10° so as to prevent the phase difference of the transmitted light.

In other words, the thin film transmits light in a predetermined transmitting wavelength band so that the following condition is satisfied, $$|\Delta_{incidence} - \Delta_{transmission}| \leq 10°$$

where $\Delta_{transmission}$ represents a phase difference between P-polarized light component and S-polarized light component of the transmitted light.

Further, the optical pickup device according to the present invention has the reflecting mirror that reflects light from the light sources to a predetermined direction and uses the above-mentioned optical element as the reflecting mirror. For this reason, the light reflected from the optical recording medium enters a detector without decreasing the intensity. Further, since the return light to the light sources is not generated, laser oscillation is carried out stably.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

TABLE 1

| [Layer number] (SUBSTRATE) | [Material] GLASS | [Physical film thickness (nm)] |
|---|---|---|
| 1 | $TiO_2$ | 108.89 |
| 2 | $SiO_2$ | 100.27 |
| 3 | $TiO_2$ | 106.27 |
| 4 | $SiO_2$ | 108.27 |
| 5 | $TiO_2$ | 59.70 |
| 6 | $SiO_2$ | 109.95 |
| 7 | $TiO_2$ | 105.50 |
| 8 | $SiO_2$ | 98.85 |
| 9 | $TiO_2$ | 110.12 |
| 10 | $SiO_2$ | 99.25 |
| 11 | $TiO_2$ | 59.76 |
| 12 | $SiO_2$ | 37.90 |
| 13 | $TiO_2$ | 35.00 |
| 14 | $SiO_2$ | 80.20 |
| 15 | $TiO_2$ | 54.91 |
| 16 | $SiO_2$ | 104.99 |
| 17 | $TiO_2$ | 103.25 |
| 18 | $SiO_2$ | 100.86 |
| 19 | $TiO_2$ | 107.45 |
| 20 | $SiO_2$ | 214.70 |
| 21 | $TiO_2$ | 51.68 |
| 22 | $SiO_2$ | 100.41 |
| 23 | $TiO_2$ | 49.78 |
| 24 | $SiO_2$ | 92.91 |
| 25 | $TiO_2$ | 61.76 |
| 26 | $SiO_2$ | 164.93 |
| 27 | $TiO_2$ | 96.33 |
| 28 | $SiO_2$ | 104.58 |
| 29 | $TiO_2$ | 53.90 |
| 30 | $SiO_2$ | 20.78 |

TABLE 1-continued

| [Layer number] (SUBSTRATE) | [Material] GLASS | [Physical film thickness (nm)] |
|---|---|---|
| 31 | TiO$_2$ | 40.82 |
| 32 | SiO$_2$ | 89.53 |

TABLE 2

| [Layer number] (SUBSTRATE) | [Material] GLASS | [Physical film thickness (nm)] |
|---|---|---|
| 1 | TiO$_2$ | 99.98 |
| 2 | SiO$_2$ | 103.51 |
| 3 | TiO$_2$ | 55.04 |
| 4 | SiO$_2$ | 185.43 |
| 5 | TiO$_2$ | 54.98 |
| 6 | SiO$_2$ | 103.94 |
| 7 | TiO$_2$ | 103.77 |
| 8 | SiO$_2$ | 104.18 |
| 9 | TiO$_2$ | 108.85 |
| 10 | SiO$_2$ | 106.66 |
| 11 | TiO$_2$ | 64.73 |
| 12 | SiO$_2$ | 45.34 |
| 13 | TiO$_2$ | 35.00 |
| 14 | SiO$_2$ | 107.82 |
| 15 | TiO$_2$ | 53.09 |
| 16 | SiO$_2$ | 103.79 |
| 17 | TiO$_2$ | 127.20 |
| 18 | SiO$_2$ | 102.58 |
| 19 | TiO$_2$ | 128.90 |
| 20 | SiO$_2$ | 117.35 |
| 21 | TiO$_2$ | 119.07 |
| 22 | SiO$_2$ | 113.14 |
| 23 | TiO$_2$ | 58.90 |
| 24 | SiO$_2$ | 121.48 |
| 25 | TiO$_2$ | 7.47 |
| 26 | SiO$_2$ | 262.79 |
| 27 | TiO$_2$ | 60.03 |
| 28 | SiO$_2$ | 91.29 |
| 29 | TiO$_2$ | 60.77 |
| 30 | SiO$_2$ | 118.50 |
| 31 | TiO$_2$ | 24.04 |
| 32 | SiO$_2$ | 60.00 |

TABLE 3

| [Layer number] (SUBSTRATE) | [Material] GLASS | [Physical film thickness (nm)] |
|---|---|---|
| 1 | SiO$_2$ | 177.73 |
| 2 | Al$_2$O$_3$ | 180.35 |
| 3 | SiO$_2$ | 162.22 |
| 4 | Al$_2$O$_3$ | 74.21 |
| 5 | TiO$_2$ | 121.43 |
| 6 | Al$_2$O$_3$ | 46.02 |
| 7 | SiO$_2$ | 168.23 |
| 8 | Al$_2$O$_3$ | 45.00 |
| 9 | TiO$_2$ | 35.33 |
| 10 | Al$_2$O$_3$ | 45.00 |
| 11 | TiO$_2$ | 35.53 |
| 12 | Al$_2$O$_3$ | 101.42 |
| 13 | TiO$_2$ | 31.44 |
| 14 | Al$_2$O$_3$ | 45.00 |
| 15 | TiO$_2$ | 48.62 |
| 16 | Al$_2$O$_3$ | 127.78 |
| 17 | SiO$_2$ | 52.46 |
| 18 | Al$_2$O$_3$ | 45.00 |
| 19 | TiO$_2$ | 51.91 |
| 20 | Al$_2$O$_3$ | 0.01 |
| 21 | TiO$_2$ | 64.05 |
| 22 | Al$_2$O$_3$ | 103.61 |
| 23 | TiO$_2$ | 7.13 |
| 24 | Al$_2$O$_3$ | 96.01 |
| 25 | TiO$_2$ | 28.89 |

TABLE 3-continued

| [Layer number] (SUBSTRATE) | [Material] GLASS | [Physical film thickness (nm)] |
|---|---|---|
| 26 | Al$_2$O$_3$ | 102.01 |
| 27 | TiO$_2$ | 5.55 |
| 28 | Al$_2$O$_3$ | 35.37 |
| 29 | SiO$_2$ | 56.47 |
| 30 | Al$_2$O$_3$ | 45.00 |
| 31 | TiO$_2$ | 33.65 |
| 32 | Al$_2$O$_3$ | 44.63 |
| 33 | TiO$_2$ | 29.50 |
| 34 | Al$_2$O$_3$ | 8.31 |
| 35 | SiO$_2$ | 83.22 |

TABLE 4

| [Layer number] (SUBSTRATE) | [Material] GLASS | [Physical film thickness (nm)] |
|---|---|---|
| 1 | Al$_2$O$_3$ | 31.39 |
| 2 | TiO$_2$ | 123.03 |
| 3 | Al$_2$O$_3$ | 26.29 |
| 4 | SiO$_2$ | 181.58 |
| 5 | Al$_2$O$_3$ | 19.06 |
| 6 | TiO$_2$ | 113.65 |
| 7 | Al$_2$O$_3$ | 45.00 |
| 8 | SiO$_2$ | 160.25 |
| 9 | Al$_2$O$_3$ | 45.00 |
| 10 | TiO$_2$ | 43.92 |
| 11 | Al$_2$O$_3$ | 45.00 |
| 12 | TiO$_2$ | 36.11 |
| 13 | Al$_2$O$_3$ | 85.10 |
| 14 | TiO$_2$ | 44.26 |
| 15 | Al$_2$O$_3$ | 45.00 |
| 16 | TiO$_2$ | 37.92 |
| 17 | Al$_2$O$_3$ | 78.12 |
| 18 | TiO$_2$ | 37.44 |
| 19 | Al$_2$O$_3$ | 45.47 |
| 20 | TiO$_2$ | 36.22 |
| 21 | SiO$_2$ | 64.90 |
| 22 | Al$_2$O$_3$ | 0.01 |
| 23 | TiO$_2$ | 20.16 |
| 24 | SiO$_2$ | 75.39 |
| 25 | TiO$_2$ | 28.41 |
| 26 | Al$_2$O$_3$ | 10.19 |
| 27 | SiO$_2$ | 41.15 |
| 28 | Al$_2$O$_3$ | 4.46 |
| 29 | TiO$_2$ | 37.67 |
| 30 | Al$_2$O$_3$ | 9.06 |
| 31 | SiO$_2$ | 49.41 |
| 32 | Al$_2$O$_3$ | 7.54 |
| 33 | TiO$_2$ | 16.13 |
| 34 | SiO$_2$ | 60.60 |
| 35 | Al$_2$O$_3$ | 45.00 |
| 36 | TiO$_2$ | 11.98 |
| 37 | Al$_2$O$_3$ | 45.00 |
| 38 | TiO$_2$ | 39.41 |
| 39 | Al$_2$O$_3$ | 25.56 |
| 40 | SiO$_2$ | 85.54 |

TABLE 5

| [Layer number] (SUBSTRATE) | [Material] GLASS | [Physical film thickness (nm)] |
|---|---|---|
| 1 | La$_2$O$_3$·Al$_2$O$_3$ | 293.94 |
| 2 | TiO$_2$ | 56.08 |
| 3 | La$_2$O$_3$·Al$_2$O$_3$ | 114.08 |
| 4 | TiO$_2$ | 11.24 |
| 5 | La$_2$O$_3$·Al$_2$O$_3$ | 106.83 |
| 6 | TiO$_2$ | 52.52 |
| 7 | La$_2$O$_3$·Al$_2$O$_3$ | 225.40 |
| 8 | TiO$_2$ | 61.70 |
| 9 | La$_2$O$_3$·Al$_2$O$_3$ | 111.00 |

TABLE 5-continued

| [Layer number] (SUBSTRATE) | [Material] GLASS | [Physical film thickness (nm)] |
|---|---|---|
| 10 | $TiO_2$ | 77.84 |
| 11 | $La_2O_3 \cdot Al_2O_3$ | 131.31 |
| 12 | $TiO_2$ | 88.75 |
| 13 | $La_2O_3 \cdot Al_2O_3$ | 139.93 |
| 14 | $TiO_2$ | 75.79 |
| 15 | $SiO_2$ | 129.77 |
| 16 | $TiO_2$ | 69.39 |
| 17 | $La_2O_3 \cdot Al_2O_3$ | 129.20 |
| 18 | $SiO_2$ | 18.66 |
| 19 | $TiO_2$ | 15.05 |
| 20 | $SiO_2$ | 24.77 |
| 21 | $TiO_2$ | 75.78 |
| 22 | $SiO_2$ | 118.79 |
| 23 | $TiO_2$ | 70.19 |
| 24 | $SiO_2$ | 84.01 |
| 25 | $La_2O_3 \cdot Al_2O_3$ | 50.80 |
| 26 | $SiO_2$ | 40.74 |
| 27 | $TiO_2$ | 8.56 |
| 28 | $SiO_2$ | 30.96 |
| 29 | $TiO_2$ | 42.78 |
| 30 | $SiO_2$ | 18.93 |
| 31 | $TiO_2$ | 18.00 |

TABLE 6

| [Layer number] (SUBSTRATE) | [Material] GLASS | [Physical film thickness (nm)] |
|---|---|---|
| 1 | $TiO_2$ | 84.53 |
| 2 | $La_2O_3 \cdot Al_2O_3$ | 153.45 |
| 3 | $TiO_2$ | 65.72 |
| 4 | $La_2O_3 \cdot Al_2O_3$ | 118.20 |
| 5 | $TiO_2$ | 85.34 |
| 6 | $La_2O_3 \cdot Al_2O_3$ | 119.69 |
| 7 | $TiO_2$ | 86.43 |
| 8 | $La_2O_3 \cdot Al_2O_3$ | 115.42 |
| 9 | $TiO_2$ | 88.81 |
| 10 | $La_2O_3 \cdot Al_2O_3$ | 125.29 |
| 11 | $TiO_2$ | 84.19 |
| 12 | $La_2O_3 \cdot Al_2O_3$ | 126.11 |
| 13 | $TiO_2$ | 87.31 |
| 14 | $La_2O_3 \cdot Al_2O_3$ | 125.40 |
| 15 | $TiO_2$ | 94.57 |
| 16 | $La_2O_3 \cdot Al_2O_3$ | 126.06 |
| 17 | $TiO_2$ | 87.35 |
| 18 | $La_2O_3 \cdot Al_2O_3$ | 134.20 |
| 19 | $TiO_2$ | 102.26 |
| 20 | $SiO_2$ | 170.60 |
| 21 | $La_2O_3 \cdot Al_2O_3$ | 11.60 |
| 22 | $TiO_2$ | 98.36 |
| 23 | $La_2O_3 \cdot Al_2O_3$ | 14.86 |
| 24 | $SiO_2$ | 181.08 |
| 25 | $TiO_2$ | 103.03 |
| 26 | $SiO_2$ | 188.00 |
| 27 | $TiO_2$ | 116.06 |
| 28 | $SiO_2$ | 160.02 |
| 29 | $TiO_2$ | 123.10 |
| 30 | $SiO_2$ | 59.12 |

What is claimed is:

1. An optical element for reflecting and transmitting light comprising:
   a substrate;
   a thin film formed on the substrate,
   wherein the thin film reflects light in a predetermined reflection wavelength band so that the following condition is satisfied, $$170° \leq |\Delta_{incidence} - \Delta_{reflection}| \leq 190°$$

where
   $\Delta_{incidence}$ represents a phase difference between P-polarized light component and S-polarized light component of the incident light to the thin film,
   $\Delta_{reflection}$ represents a phase difference between P-polarized light component and S-polarized light component of the light reflected by the thin film; and
   wherein the thin film transmits a light in a predetermined transmission wavelength band so that the following condition is satisfied, $$|\Delta_{incidence} - \Delta_{transmission}| \leq 10°$$

where
   $\Delta_{transmission}$ represents a phase difference between P-polarized light component and S-polarized light component of the transmitted light.

2. The optical element of claim 1, wherein the wavelength of the light in the reflecting wavelength band is at least one of 407±10 nm, 660±15 nm and 787±15 nm.

3. The optical element of claim 1, wherein polarization state of the incident light to the thin film is circularly polarized light.

4. The optical element of claim 1, wherein the wavelength of the light in the reflecting wavelength band is 407±10 nm, and the wavelength of the light in the transmitting wavelength band is at least one of 660±15 nm and 787±15 nm.

5. The optical element of claim 1, wherein the wavelength of the light in the reflecting wavelength band is 787±15 nm, and the wavelength of the light in the transmitting wavelength band is at least one of 660±15 nm and 407±10 nm.

6. An optical element for reflecting and transmitting light comprising:
   a substrate:
   a thin film formed on the substrate,
   wherein the thin film reflects light in a predetermined reflection wavelength band so that the following condition is satisfied, $$170° \leq |\Delta_{incidence} - \Delta_{reflection}| \leq 190°$$

where
   $\Delta_{incidence}$ represents a phase difference between P-polarized light component and S-polarized light component of the incident light to the thin film,
   $\Delta_{reflection}$ represents a phase difference between P-polarized light component and S-polarized light component of the light reflected by the thin film; and
   wherein the wavelength of the light in the reflecting wavelength band is 407±10 nm, and the wavelength of the light in the transmitting wavelength band is at least one of 660±15 nm and 787±15 nm.

7. An optical element for reflecting and transmitting light comprising:
   a substrate; and
   a thin film formed on the substrate,
   wherein the thin film reflects light in a predetermined reflection wavelength band so that the following condition is satisfied, $$170° \leq |\Delta_{incidence} - \Delta_{reflection}| \leq 190°$$

where
   $\Delta_{incidence}$ represents a phase difference between P-polarized light component and S-polarized light component of the incident light to the thin film; and
   $\Delta_{reflection}$ represents a phase difference between P-polarized light component and S-polarized light component of the light reflected by the thin film; and wherein the wavelength of the light in the reflecting wavelength band is 787±15 nm, and the wavelength of the light in the transmitting wavelength band is at least one of 660±15 nm and 407±10 nm.

8. An optical pickup device comprising:

two or more light sources that emit light with different wavelengths, respectively;

an objective lens that condenses the light onto a recording medium;

a wavelength selecting filter, positioned on an optical path between the light sources and the objective lens, at least synthesizing optical paths from the light sources, the wavelength selecting filter having a substrate and a thin film formed on the substrate; and a detecting unit that detects reflected light from the recording medium through the objective lens and the wavelength selecting filter, wherein the thin film reflects a light in a predetermined reflection wavelength band so that the following condition is satisfied, $$170° \leq |\Delta_{incidence} - \Delta_{reflection}| \leq 190°$$

where $\Delta_{incidence}$ represents a phase difference between P-polarized light component and S-polarized light component of the incident light to the thin film, and $\Delta_{reflection}$ represents a phase difference between P-polarized light component and S-polarized light component of the light reflected by the thin film.

9. The optical pickup device of claim 8, wherein the thin film transmits a light in a predetermined transmission wavelength band so that the following condition is satisfied, $$|\Delta_{incidence} - \Delta_{transmission}| \leq 10°$$

where $\Delta_{transmission}$ represents a phase difference between P-polarized light component and S-polarized light component of the transmitted light.

10. The optical pickup device of claim 9, wherein the wavelength of the light emitted from light source is at least one of 407±10 nm, 660±15 nm and 787±15 nm.

11. The optical pickup device of claim 8, further comprising a quarter wavelength plate positioned in an optical path between the light sources and the wavelength selecting filter.

12. The optical pickup device of claim 8, wherein the wavelength of the light emitted from light source is at least one of 407±10 nm, 660±15 nm and 787±15 nm.

* * * * *

UNITED STATES PATENT AND TRADEMARK OFFICE
CERTIFICATE OF CORRECTION

PATENT NO. : 7,385,760 B2
APPLICATION NO. : 11/287798
DATED : June 10, 2008
INVENTOR(S) : Tomokazu Taguchi et al.

It is certified that error appears in the above-identified patent and that said Letters Patent is hereby corrected as shown below:

On the Title Page

Item (75), after "Taguchi," delete "Sakai" and substitute --Osaka-- in its place.

Item (75), after "Hatano," delete "Suita" and substitute --Osaka-- in its place.

In column 14, claim 6, line 33, immediately after "a substrate" delete ":" and substitute --;-- in its place.

Signed and Sealed this

Twenty-eighth Day of July, 2009

JOHN DOLL
*Acting Director of the United States Patent and Trademark Office*